Aug. 26, 1930.  R. LOIBL  1,774,387
VERMIN EXTERMINATOR
Filed June 12, 1929  2 Sheets-Sheet 1

R. B. Loibl
INVENTOR

BY Victor J. Evans
ATTORNEY

Aug. 26, 1930.  R. LOIBL  1,774,387
VERMIN EXTERMINATOR
Filed June 12, 1929  2 Sheets-Sheet 2

R. B. Loibl
INVENTOR
BY Victor J. Evans
ATTORNEY

Patented Aug. 26, 1930

1,774,387

UNITED STATES PATENT OFFICE

ROBERT LOIBL, OF LOS ANGELES, CALIFORNIA

VERMIN EXTERMINATOR

Application filed June 12, 1929. Serial No. 370,435.

This invention relates to vermin exterminators and more particularly to an insect destroyer especially designed for the extermination of ants.

The general object of the invention is to provide an insect destroyer that is primarily designed to receive poisonous liquid as a destructive medium, with means to prevent the liquid from being casually spilled therefrom or children or pets having access thereto, yet the structure allows ready access of ants thereto whereby they may enter and partake of the liquid and thence leave the structure with ease, after which the poisonous liquid partaken or absorbed by the ant will have a reactive effect which will cause the death of the insect.

Another object of the invention is to provide an insect destroyer that will perform its intended function, even if a portion thereof is immersed in water, on account of the water not being able to get into the adjacent or upper chamber of the structure.

A further object of the invention is to provide an insect destroyer that may be placed in any supported position without danger of spilling the liquid therefrom.

A still further object of the invention is to provide an insect destroyer that may be manufactured from any material, is simple in construction, inexpensive to manufacture and is extremely efficient in operation and service.

Another object of the invention is to provide an insect destroyer that may be readily packed for shipment or may be stored without danger of damage or breakage thereto.

This invention also consists in certain other features of construction and in the combination and arrangement of the several parts, to be hereinafter fully described, illustrated in the accompaying drawings and specifically pointed out in the appended claims.

In describing my invention in detail, reference will be had to the accompanying drawings wherein like characters denote like or corresponding parts throughout the several views, and in which.

Figure 1:
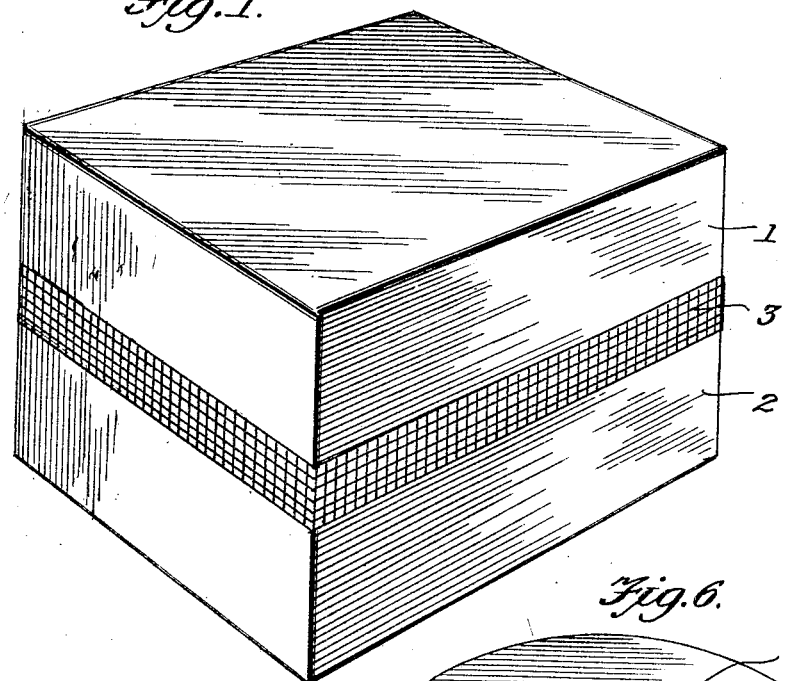
Figure 1 is a perspective view of my insect destroyer in its entirety.
Figure 4:
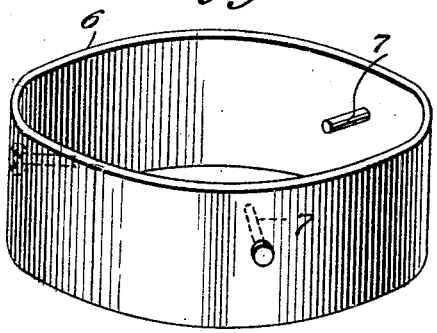
Figure 4 is a perspective view of one of the deflector rings having retaining pins formed therewith and which provides a part of my invention.
Figure 6:
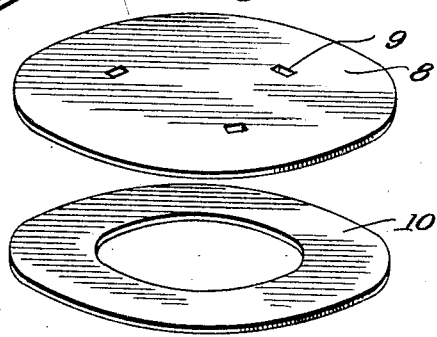
Figure 6 is a perspective view of the cover plate for one of the flanges.
Figure 5:
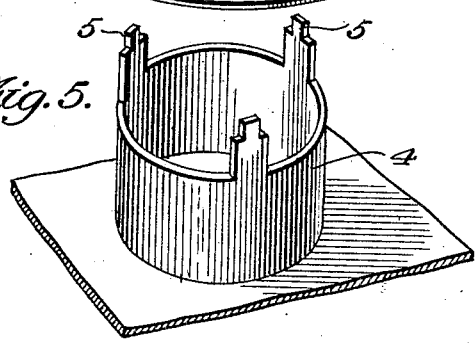
Figure 5 is a fragmentary view illustrating some parts of my invention before being assembled.
Figure 2:
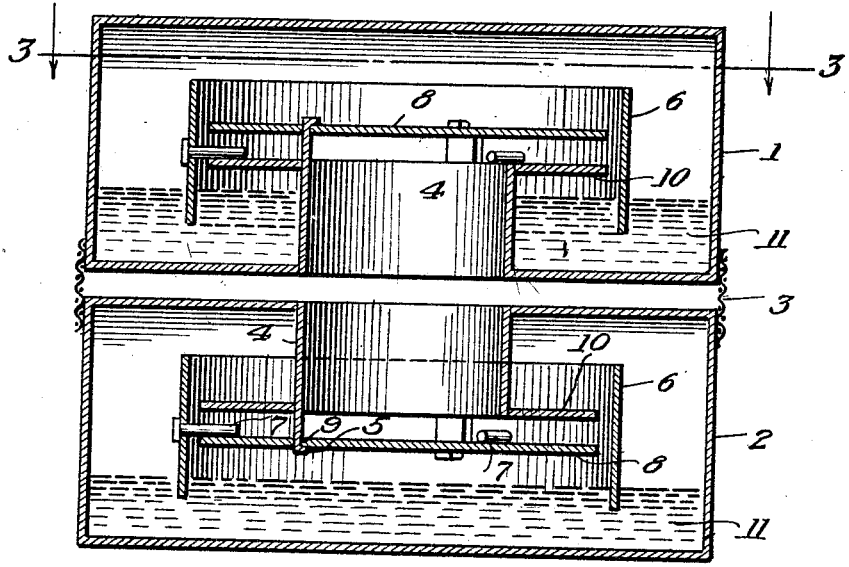
Figure 2 is a sectional view therethrough.
Figure 3:
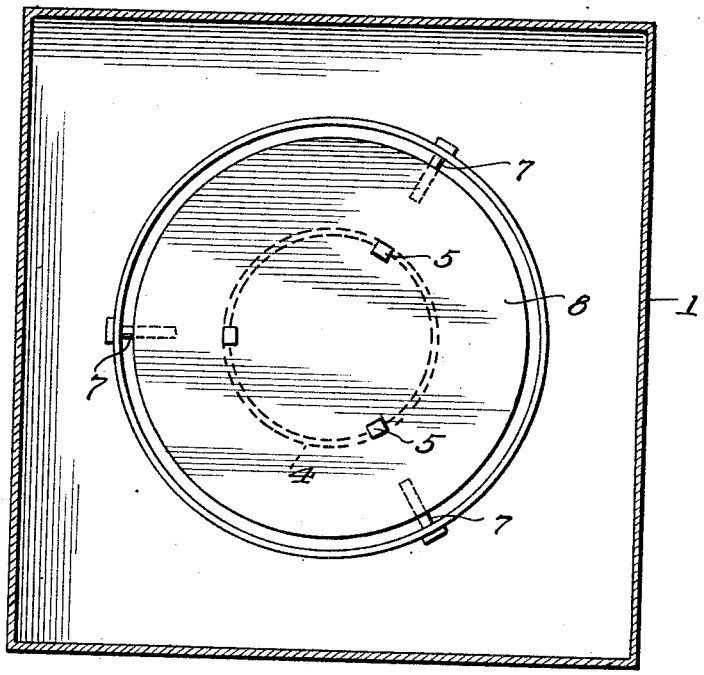
Figure 3 is a sectional view taken approximately on line 3—3 of Figure 2, looking in the direction of the arrows.

The exterminator is a bi-compartment receptacle in which an exterminating liquid is retained and used for the extermination of insects. The two similarly constructed compartments 1 and 2, of the exterminating receptacle permanently retain equal amounts of exterminating liquid after they have been filled throughout the useful condition of the receptacle. However, if it is desired, the exterminating receptacles can be punctured, emptied, sterilized, refilled and thereafter the punctures soldered or otherwise closed and the device may thus be used repeatedly.

Each of the six sided compartments of the receptacles 1 and 2 are exactly similar in construction, and each six sided compartment of the exterminating receptacle is circummured by an outer solid plate, four solid side pieces and one inner side piece. In this description no pieces or parts will be designated by the use of the words "top-piece", "bottom-piece", etc., because any side or any corner of the two compartments of the receptacle may be used as its base as it operates equally well in any position.

The confronting faces of the exterminating compartments 1 and 2 are arranged at a slight but suitable distance away from each other, and both of the compartments must be placed in such position that the four corners of one compartment exactly conincide with the four corners of the adjacent compartment.

The relative positions of the two compartments are permanently secured by one square copper wire screen band 3 which is attached to the four edges and the four corners of each of the compartments 1 and 2.

Passing centrally through an opening in the confronting faces of each of the compartments 1 and 2 and secured to such faces are tubes 4. To the unsupported end of each tube 4 there is rigidly attached at right angles to said tube a washer 10. Each tube is formed with equidistantly spaced projecting pieces 4′ which at their outer ends are formed with reduced extensions 5, and these extensions 5 are designed to be passed through openings 9 and bent over the outer faces of discs 8. The discs 8 and 10 are thus held in spaced relation to each other and afford therebetween passages for the insects which find an entrance through the interstices of the mesh 3 and through the tubes 4 so that the said insects may absorb or partake of the attractive but poisonous fluid 11 in the respective compartments 1 and 2. The outer disc 8 and the inner washer 10 in each of the compartments 1 and 2 are spaced a considerable distance apart sufficiently far to prevent any one of the three deflecting band retaining pins 7 of each of the compartments from simultaneously touching any part of the washer 10 and any part of the flat disc 8 in either of the said compartments.

The object of this particular arrangement and spacing apart of the disc and washer in each of the compartments is to prevent any form of binding or clamping action upon the three equidistantly spaced circular deflecting band retaining pins 7 in either of the two compartments of the exterminator that will hold the said pins rigidly in any one fixed position, that will prevent any of the valve acting tendencies of one of the circular deflecting bands in each of the two compartments. The deflecting bands are indicated by the numeral 6 and as disclosed by the drawings the pins 7 pass approximately centrally through and, as previously stated, pass through the members 8 and 10 in each of the compartments. Each deflector band 6 is of a width materially greater than the distance between the members 8 and 10 and the inner circumference of each deflecting band 6 of each compartment is sufficiently larger than the peripheral distance of each member 8 and 10 of each compartment to prevent more than one point of contact of the said band therewith at any time between any part of the said elements 8 and 10. This space is also used as an ingress and egress by the insects while feeding on the exterminating liquid. The pins 7 will also hold the deflector bands 6 a suitable distance away from the outer walls of the compartments 1 and 2 and likewise a suitable distance away from the inner walls of the said compartments. It is to be understood that each of the three equidistantly spaced circular deflecting band pins 7 are loosely and freely retained between the adjacent sides of the members 8 and 10, so that the circular deflector band 6 of each compartment may rotate in any concentrical or eccentrical manner simultaneously around the entire periphery of the members 8 and 10 in each of the compartments 1 and 2. The deflector band in each of the compartments has a valvular action and the outer faces of the members 8 and 10 serve as baffle plates. Thus the device may be tilted or canted at any desired angle and the deflector bands 6 will contact and close the space between the upper edges of the elements 8 and 10 and prevent the flow of the liquid 11 through the top portions thereof, while the said outer faces of the elements 8 and 10 will deflect the liquid therefrom, causing the same to sink to the bottom of the lower portion of the device, so that the exterminator can be handled in any manner without liability of the liquid flowing through either of the tubes 4 and finding an outlet between the confronting faces of the compartments 1 and 2 and consequently through the interstices of the mesh 3. The result is that the device may be handled in any desired manner and as a matter-of-fact, may be thrown or tossed to the place where it is desired to rest without any liability of the escape of the liquid therefrom.

The improvement may be constructed of any suitable non-odorous, moisture-proof shape, maintaining material, that is, either metal, glass, wood, fibre, etc. The device is preferably colored lawn green but, of course, may be given any other color and the paint giving such coloring is moisture proof and non-odorous. The device naturally varies in weight in accordance with the quantity of exterminating liquid received therein. The device is filled by immersing half of the exterminator into the exterminating liquid for three minutes, the copper wire screen 3 extending vertically. It is then withdrawn to allow the circumfluent liquid to drain off of the exterminator and is then rinsed with water to obtain proper service or storage conditions. The exterminator thus automatically measures the liquid and cannot be over filled. The exterminator when used for Argentine ant extermination should be placed about the infested building say one every ten feet apart. In placing the exterminator any one of its six sides may be used as its base. Other exterminators should also be placed at all strategical locations over the entire premises. Moisture in the form of fog, rain, hose use, lawn sprinklers, hail and snow does not prevent the exterminator from operating properly. Insects reach the exterminating liquid after passing through the interstices of the copper wire screen band 3 by the route used by the exterminating liquid when the exterminator was filled and they depart by the reverse directions of the same route. As stated, the valvular action of the circular deflecting bands 6 prevents the exterminating liquid from escaping from the compartments even though the exterminator may be tossed into the air, rolled on the lawn or when subjected to a violent shaking motion with the hand. This protects the exterminating liquid from curious persons and animals. If it happens to be carelessly kicked or tossed about the premises, it resumes its exterminational service in any position wherever it stops, regardless of its mode of travel and as the exterminating liquid is concealed in the compartments 1 and 2 access thereto and deleterious effects therefrom cannot be obtained by humans or animals. The exterminators can be packed for storage, or shipment, after being filled with the exterminating liquid as they are spill-proof and there is no leakage while being handled.

What I claim is:

1. An insect exterminator comprising a pair of companion sections, means to allow insects to pass therethrough and securing the sections in spaced relation with respect to each other to provide a passageway, cylindrical flanges extending inwardly from the confronting faces of said sections, deflecting rings disposed in spaced relation with respect to the flanges and surrounding the same, cover plates for the inner ends of the flanges and extending beyond the outer edges thereof, ring like plates surrounding the cover plates, and means extending inwardly from the deflecting rings and disposed between the cover plates and the ring like plates to arrange the cover plates in spaced relation to the cylindrical flanges for providing passageways.

2. An insect exterminator comprising a pair of like sections, means for securing the sections together to provide a passageway between the same, each of said sections being adapted to receive liquid, and means included in each of said sections to prevent the liquid from being spilled therefrom, but allowing free ingress and egress of insects to and from the liquid.

3. An insect exterminator comprising a pair of like sections, a strip of wire mesh material securing the sections together in spaced relation to provide a passageway between the same, said wire mesh material having interstices of a size to allow for the passage of insects therethrough, each section being adapted to receive liquid and means included in each section to prevent the liquid from being spilled therefrom, but allowing free ingress and egress of insects to and from the liquid.

4. An insect exterminator comprising a pair of like sections, a strip of wire mesh material having interstices of a size to allow for the passage of insects and being secured about said sections to hold the latter in spaced relation with respect to each other to provide a passageway therebetween, flanges extending inwardly from each section and communicating with the passageway, means for closing the inner ends of said flanges and being arranged in spaced relation with respect thereto to provide passages and deflecting means disposed about said passages.

5. An insect exterminator comprising a pair of like sections, a strip of wire mesh material disposed about said sections and holding them in spaced relation about each other to provide a passageway, said strip having interstices of a size to allow for the passage of ants therethrough, flanges included in each section and extending therein, said flanges having communication with the passageway, tongues formed on the inner ends of said flanges, cover plates having slots therein to accommodate said tongues, ring like plates surrounding the flanges, deflector means surrounding the flanges in spaced relation thereto, and pins extending inwardly from the deflecting means for retaining the deflector ring in its proper position.

6. An insect exterminator comprising a pair of like sections, means disposed about said sections and securing them together but in spaced relation with respect to each other to provide a passageway between the same, said means having interstices to allow for the passage of ants therethrough, flanges extending inwardly from the confronting walls of the sections and being in communication with the passageway, cover plates for the inner ends of the flanges, ring like plates disposed about the flanges and aligned with the inner edges thereof, deflector rings surrounding the flanges in spaced relation thereto, and pins extending inwardly from the deflector rings and disposed between the ring like plates and cover plates respectively to hold the deflector in place.

In testimony whereof I affix my signature.

ROBERT LOIBL.